(12) United States Patent
Pepperell

(10) Patent No.: US 8,416,279 B2
(45) Date of Patent: Apr. 9, 2013

(54) METHOD, DEVICE AND COMPUTER SYSTEM FOR PROCESSING IMAGES IN A CONFERENCE BETWEEN A PLURALITY OF VIDEO CONFERENCING TERMINALS

(75) Inventor: Andrew Pepperell, Middlesex (GB)

(73) Assignee: Cisco Technology, Inc., San Jose, CA (US)

(*) Notice: Subject to any disclaimer, the term of this patent is extended or adjusted under 35 U.S.C. 154(b) by 638 days.

(21) Appl. No.: 12/645,519

(22) Filed: Dec. 23, 2009

(65) Prior Publication Data

US 2010/0157017 A1 Jun. 24, 2010

Related U.S. Application Data

(60) Provisional application No. 61/140,422, filed on Dec. 23, 2008.

(30) Foreign Application Priority Data

Dec. 23, 2008 (NO) .................................. 20085370

(51) Int. Cl.
*H04N 7/15* (2006.01)
*H04M 11/00* (2006.01)

(52) U.S. Cl. ............... 348/14.09; 348/14.01; 348/14.08; 348/14.12; 348/607; 348/718; 370/260; 370/263; 370/332; 370/352; 455/450; 709/242

(58) Field of Classification Search ............... 348/14.01, 348/14.08, 14.09, 14.12, 718, 607; 370/260, 370/263, 332, 352; 455/450; 709/242
See application file for complete search history.

(56) References Cited

U.S. PATENT DOCUMENTS

| | | | |
|---|---|---|---|
| 5,600,646 A * | 2/1997 | Polomski ..................... | 370/263 |
| 5,963,547 A * | 10/1999 | O'Neil et al. ................. | 370/260 |
| 6,124,881 A * | 9/2000 | Terui et al. .................. | 348/14.09 |
| 6,584,077 B1 * | 6/2003 | Polomski ..................... | 370/263 |
| 7,031,718 B2 * | 4/2006 | Jouppi et al. ................. | 455/450 |
| 7,034,860 B2 | 4/2006 | Lia et al. | |
| 7,395,350 B1 * | 7/2008 | de Caluwe et al. ........... | 709/242 |

(Continued)

FOREIGN PATENT DOCUMENTS

| EP | 1 830 568 A2 | 9/2007 |
|---|---|---|
| WO | WO 2008/101117 A1 | 8/2008 |

OTHER PUBLICATIONS

Extended European Search Report issued May 3, 2012, in European Patent Application No. 09835319.6.

*Primary Examiner* — Gerald Gauthier
(74) *Attorney, Agent, or Firm* — Oblon, Spivak, McClelland, Maier & Neustadt, L.L.P.

(57) ABSTRACT

Processing images in conference between a plurality of video conferencing terminal. The method includes providing properties of terminals, defining a number of groups based on the properties of the terminals, then determining an ordered list of the a number of groups, and determining a pane layout for displaying images from the terminals. The pane layout is determined based on the provided properties of the terminal the pane layout is displayed on and the properties of the other terminals in the conference. Then, mapping the ordered list of the number of groups to the respective determined pane layout, and providing at least one composite image stream to each of the terminals according to the selected pane layout and mapping of the a number of groups. Different types of telepresence endpoints, (e.g. different manufacturers, numbers of screens/cameras, etc.) can thus interoperate well in the same video conference.

19 Claims, 11 Drawing Sheets

U.S. PATENT DOCUMENTS

| | | | |
|---|---|---|---|
| 7,701,926 B2* | 4/2010 | Gavish et al. | 370/352 |
| 7,933,248 B2* | 4/2011 | Hong et al. | 370/332 |
| 7,944,509 B2* | 5/2011 | Tanaka | 348/718 |
| 8,144,187 B2* | 3/2012 | Moore et al. | 348/14.12 |
| 8,217,981 B2* | 7/2012 | Saleh et al. | 348/14.01 |
| 8,284,231 B2* | 10/2012 | Ellner | 348/14.08 |
| 8,310,596 B2* | 11/2012 | Bjontegaard | 348/607 |
| 2002/0055917 A1* | 5/2002 | Muraca | 707/1 |
| 2004/0008635 A1* | 1/2004 | Nelson et al. | 370/260 |
| 2008/0100696 A1* | 5/2008 | Schirdewahn | 348/14.09 |
| 2008/0117285 A1 | 5/2008 | Tanaka | |
| 2009/0086013 A1* | 4/2009 | Thapa | 348/14.08 |
| 2010/0149307 A1* | 6/2010 | Iyer et al. | 348/14.09 |
| 2010/0157017 A1* | 6/2010 | Pepperell | 348/14.09 |

* cited by examiner

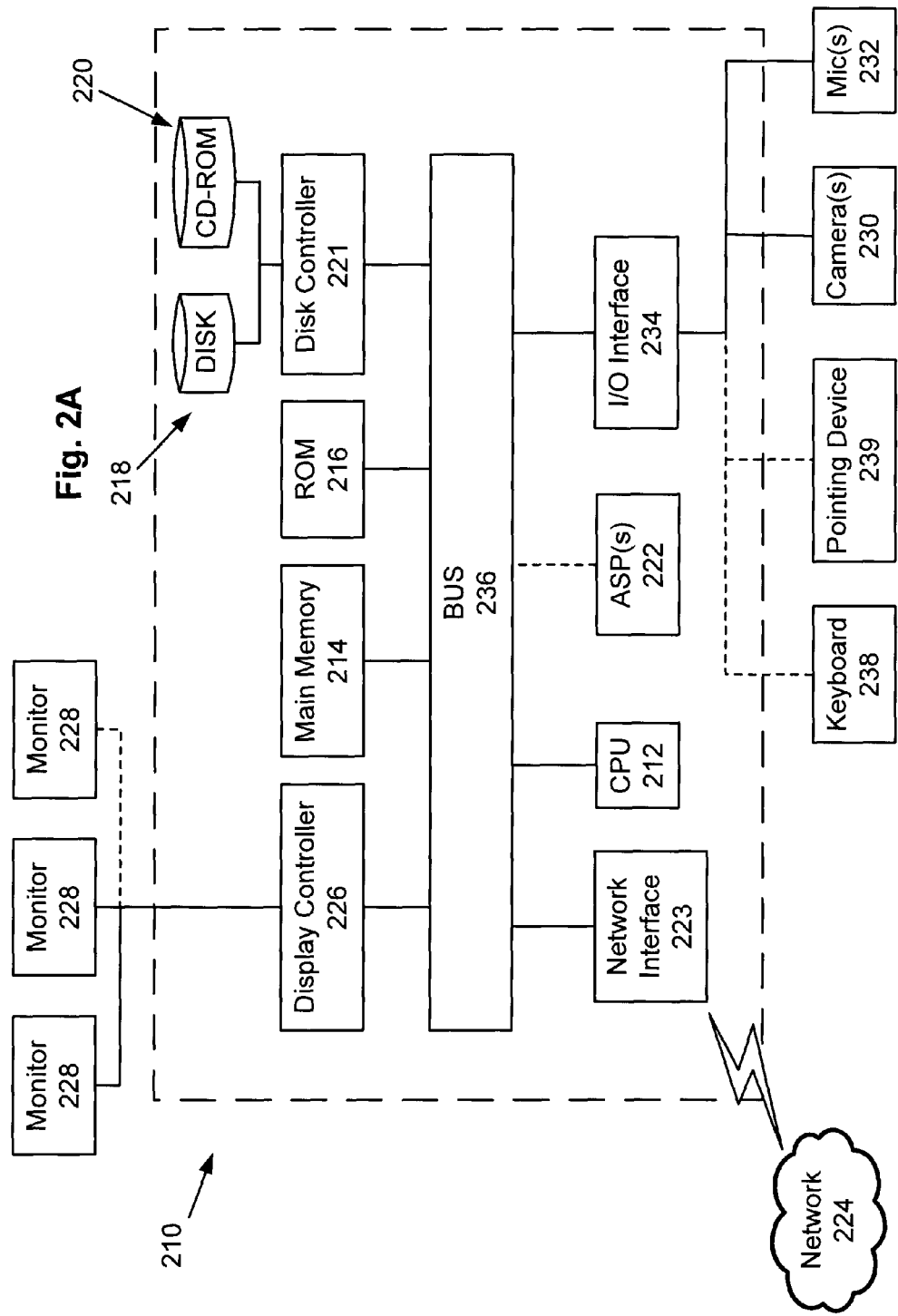

|  |  | Configuration of the other conference terminals | | | |
| --- | --- | --- | --- | --- | --- |
|  |  | At least one 4 screen group | At least one 3 screen group | No 3 or 4 screen group | No 4 screen group |
| Number of screens of viewing conference terminal | 1 | ▦ | ▦ |  | ⊞ |
|  | 2 | ▦▦ | | | ▭▭ |
|  | 3 | ▦▦▦ | | ▭▭▭ ▭▭▭ | |
|  | 4 | | ▭▭▭▭ | | |

Fig. 4

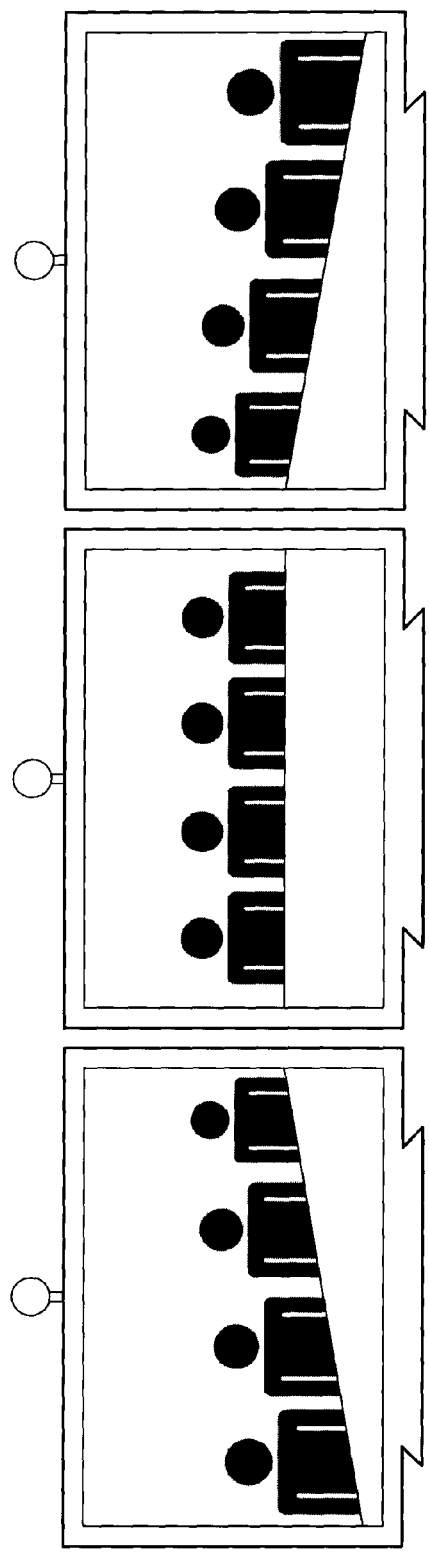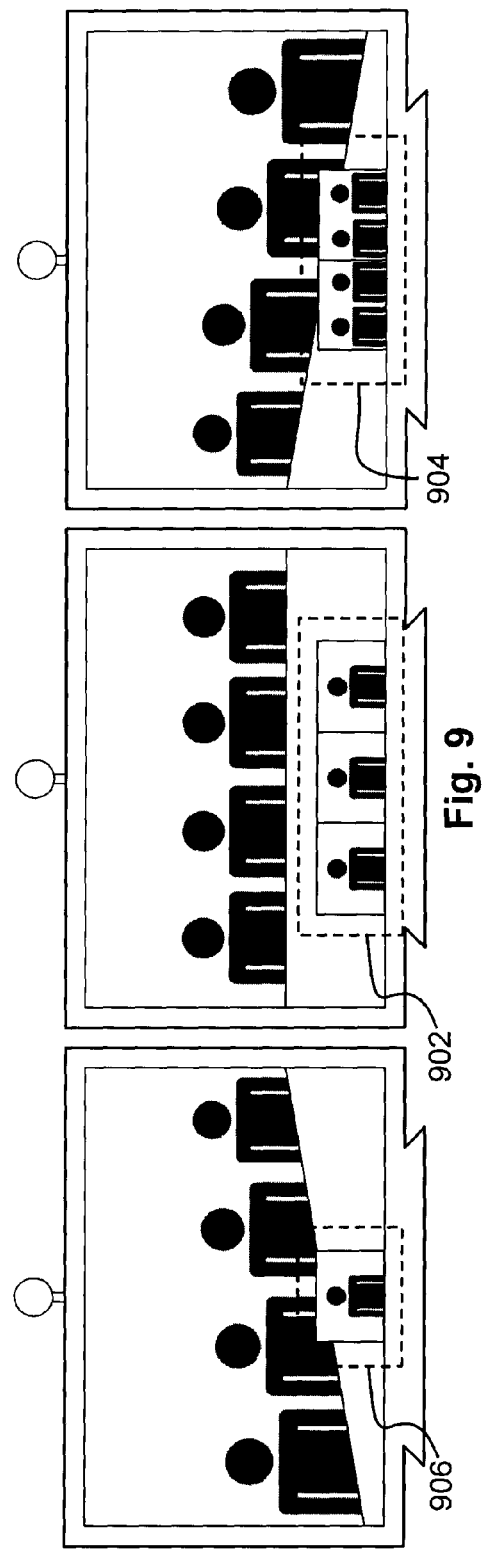

METHOD, DEVICE AND COMPUTER SYSTEM FOR PROCESSING IMAGES IN A CONFERENCE BETWEEN A PLURALITY OF VIDEO CONFERENCING TERMINALS

RELATED APPLICATIONS

This application claims priority under 35 U.S.C. §119 to U.S. Application No. 61/140,422, filed on Dec. 23, 2008, and Norwegian Application No. 20085370, filed on Dec. 23, 2008. The entirety of each is incorporated herein by reference.

BACKGROUND

1. Technical Field

This disclosure relates in general to the field of video conferencing and telepresence systems. More specifically, this disclosure relates to a method, a device and a computer system for processing images in a conference between a plurality of video conferencing terminals.

2. Discussion of the Background

Conventional video conferencing systems include a number of video conferencing terminals (endpoints) communicating real-time video, audio and/or data (often referred to as duo video) streams over and between various networks such as WAN, LAN and circuit switched networks.

A number of video conference systems residing at different sites may participate in the same conference, most often, through one or more MCU's (Multipoint Control Units) performing, amongst other tasks, switching and mixing functions to allow the audiovisual terminals to intercommunicate properly.

Video conferencing systems presently provide communication between at least two locations for allowing a video conference among participants situated at each station.

Telepresence systems are enhanced video conference systems. Typically, terminals in telepresence systems have a plurality of large scaled displays for life-sized video, often installed in rooms with interiors dedicated to and tailored for video conferencing, all to create a conference as close to personal (i.e. in person) meetings as possible. The terminals in telepresence systems are provided with one or more cameras. The outputs of those cameras are transmitted along with audio signals to a corresponding plurality of displays at a second location such that the participants at the first location are perceived to be present or face-to-face with participants at the second location.

A display device of a video conferencing device, in particular a video conferencing terminal 100 of the telepresence type, is shown in FIG. 1A as arranged in front of a plurality of (four illustrated) local conference participants 102. The local participants 102 are located along a table 104, facing the terminal 100 which includes a plurality of display screens 106. In the illustrated example, three display screens 106 are included in the display device. A first, a second and a third display screens 106 are arranged adjacent to each other. The first, second and third display screens 106 are used for displaying images captured at one or more remote conference sites of a corresponding telepresence type.

A fourth display screen 108 is arranged at a central position below the second display screen 106. In a typical use, the fourth screen 108 may be used for computer-generated presentations or other secondary conference information. Alternatively, the fourth screen 108 is replaced by several table mounted displays 110, as shown in FIG. 1B. Video cameras 112 are arranged on top of the upper display screens 106 in order to capture images of the local participants 102, which are transmitted to corresponding remote video conference sites.

A purpose of the setup shown in FIGS. 1A and 1B is to give the local participants 102 a feeling of actually being present in the same meeting-room as the remote participants that are shown on the respective display screens 106.

Key factors in achieving a feeling of presence are the ability to see at whom the remote participants are looking, that all the participants are displayed in real life size and that all displayed participants appear equally sized relative to each other. Another provision for achieving high quality telepresence is that the images of the remote participants are presented to each local participant as undistorted as possible.

In order to obtain this feeling of presence, a special set of rules, or a proprietary protocol, is used by telepresence systems. Therefore, a telepresence system, such as the ones shown in FIGS. 1A and 1B, will operate properly only with other telepresence systems supporting that set of rules (or protocol). This is further complicated by the fact that different telepresence systems can employ different numbers of display screens, e.g. one, two, three or four display screens. Finally, more than two telepresence systems can participate in a conference, and all the participants will still expect the same feeling of presence as with a two systems conference.

Further, since there has not been defined a standard protocol for telepresence systems, only telepresence systems from the same manufacturer tend to interoperate in a satisfactory way.

In many situations there is also a need to call, or receive a call from, a telepresence system from, e.g., a regular video conferencing terminal even though the regular video conferencing terminal does not provide the same feeling of presence.

U.S. Pat. No. 7,034,860, which is incorporated herein by reference in its entirety, describes an apparatus and method for dynamically determining an image layout based on the numbers of participants or video sources connected to a conferences. The system combines each video source into a composite video signal according to the defined composite image layout, and transmits this composite signal to the connected sites. This works well with single screen systems, but a problem arises when two multi-screen telepresence systems with different numbers of screens are connected, more than two multi-screen telepresence systems are connected, and/or when single screen systems are connected to one or more multi-screen systems.

Thus, there is a need in the art to allow different types of telepresence endpoints (e.g. different manufacturers, different numbers of screens/cameras, etc.) to work well together in the same video conference.

SUMMARY

This disclosure provides a method, a computer system portion, and a video conferencing device as set forth in the appended claims.

In particular, a method is provided for processing images in conference between a plurality of video conferencing terminals, including first providing properties of at least two video conferencing terminals, then defining a number of groups based on the properties of the at least two video conferencing terminals. Subsequently, for each of the video conferencing terminal, determining an ordered list of the a number of groups, determining a pane layout for displaying images from the video conferencing terminals, the pane layout being determined based on the properties of the video conferencing terminal the layout is to be displayed on and the properties of the other video conferencing terminals in the conference, mapping the ordered list of the number of groups to the respective determined pane layout, and finally providing at least one composite image stream to each of the video conferencing terminals according to the selected pane layout and mapping of the a number of groups.

BRIEF DESCRIPTION OF THE DRAWINGS

In order to make the invention more readily understandable, the discussion that follows will refer to the accompanying drawings, wherein:

FIG. 2A shows an exemplary hardware arrangement of a telepresence video conferencing system according to aspects of this disclosure;

FIG. 4 is an exemplary overview of video conference terminal screen layouts according to one aspect of this disclosure according to aspects of this disclosure;

FIG. 8 is a schematic illustration of a telepresence terminal in an exemplary embodiment according to this disclosure; and FIG. 9 is a schematic illustration of a telepresence terminal in another exemplary embodiment according to this disclosure.

DETAILED DESCRIPTION OF EMBODIMENTS

Figure 1A:
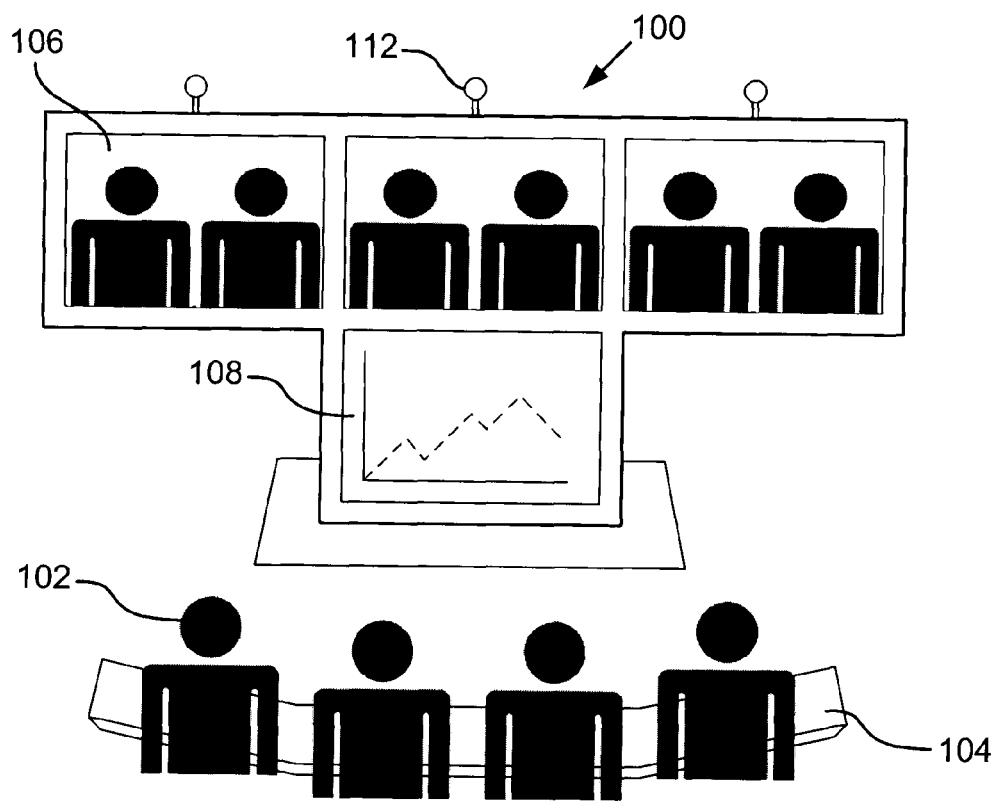
FIG. 1A is a schematic view illustrating background art aspects of a telepresence video conferencing system.
Figure 1B:
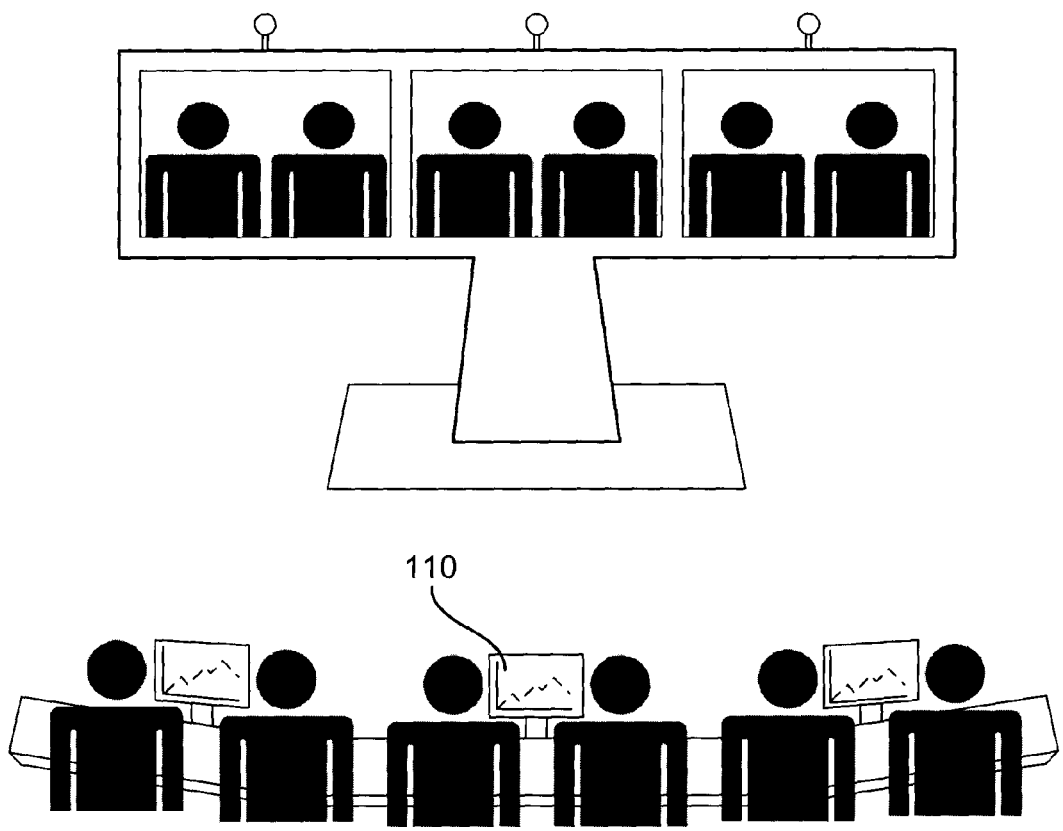
FIG. 1B is a schematic view illustrating background art aspects of a telepresence video conferencing system.

In the following, aspects of the claimed invention are described with reference to preferred embodiments, and by referring to the accompanying drawings. However, people skilled in the art will recognize other applications and modifications within the scope of the invention as defined in the enclosed independent claims.

A telepresence system in accordance with the following disclosure may be described as an endpoint. As readily understandable for a person skilled in the art, a telepresence compliant endpoint might be replaced by a telepresence compliant Multipoint Control Unit (MCU), also known as a telepresence server.

Generally, as shown in FIG. 2A, an exemplary MCU 210 includes a CPU 212, which processes data and instructions stored in memory 214 and/or ROM 216. The CPU 212 also processes information stored on the disk 218 or CD-ROM 220 through a disk controller 221. The exemplary CPU 212 may be an Intel Pentium-based processor from Intel of America. Of course, other processor and hardware vendors and types are known in the art such as Freescale ColdFire, i.MX and ARM processors from Freescale Corporation of America. Thus, instructions corresponding to the processes described herein and in accordance with exemplary aspects of this disclosure are stored on any one of the memory 214, ROM 216, disk 218, or CD-ROM 220. The memory 214 may include random access memory (RAM), flash memory, EEPROM memory, or the like, while the ROM 216 is read-only memory, such as PROMs; the disk 218 is a hard disk drive, a solid state drive, or a combination thereof; and the CD-ROM drive 220 preferably includes DVD functionality.

In some aspects, the MCU 210 includes an application-specific processor (ASP) 222, which is preferably a programmable processor. The ASP 222 is configured to perform video compression and/or decompression. For example, the ASP 222 is a MPEG-based codec. Alternatively, the MCU 210 includes computer-readable instructions which enable the CPU 212 to compress and/or decompress video.

The MCU 210 also preferably includes a network interface 223, such as a an IEEE 802.x compliant network controller, for interfacing with the MCU 210 via a network 224 or the Internet; a display controller 226 for interfacing with displays 228, such as an LCD or plasma-based display; and cameras 230 and microphones 232 interfaced through an I/O interface 234 to a BUS 236. As discussed above, at least one ASP 222 and camera 230 is provided for each of displays 228.

In some aspects, the MCU 210 also includes a keyboard 238 and a pointing device 239 interfaced through the I/O interface 234. A description of the general features and functionality of the aforementioned components is omitted for brevity as these features are well known.

The exemplary MCU 210 shown in FIG. 2A is therefore a hardware platform of a computing device. Computer-readable instructions can be stored on any one of the aforementioned disk drives or memory devices, including the disk 218 and the ROM 216. Computer readable-instructions may also be provided as a utility application, background daemon, or component of an operating system, or combination thereof, executing in conjunction with CPU 212 and an operating system such as UNIX, Solaris, LINUX and other systems known to those skilled in the art. Further, it should be appreciated the structural hardware relationships depicted in FIG. 2A can be alternatively arranged as one skilled in the art will readily appreciate.

Figure 2B:
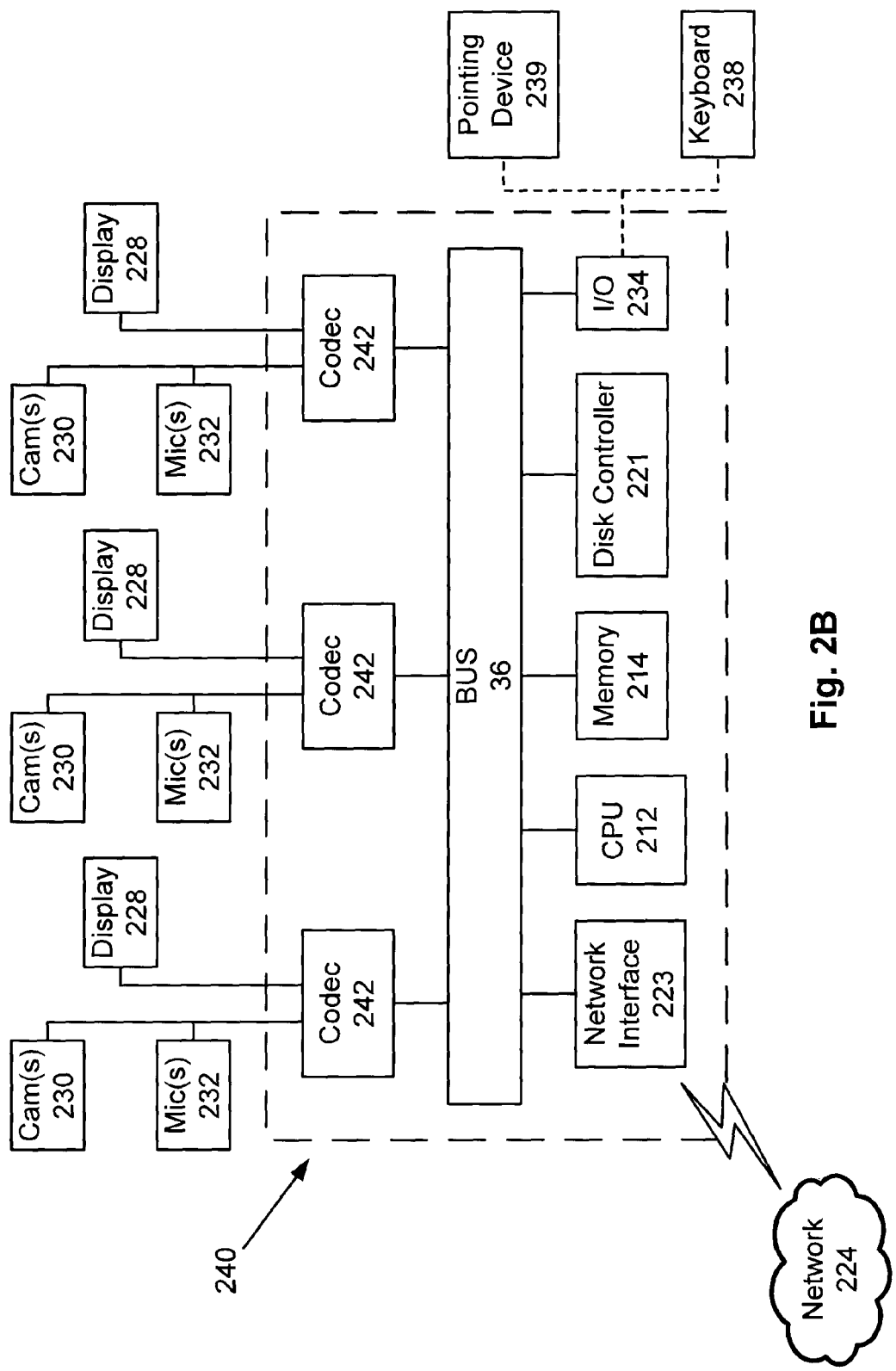
FIG. 2B shows an alternative exemplary hardware arrangement of a telepresence video conferencing system according to aspects of this disclosure.

For example, as shown in FIG. 2B, a telepresence apparatus 240 is shown to include components and a configuration similar to the aforementioned MCU 210 shown in FIG. 2A. The telepresence apparatus 240, however, shows each of displays 228 and respective camera(s) 230 and microphones 232 connected to a respective codec 242, which is a device for encoding and decoding (compressing/decompressing) audio and visual data. The codecs 242 are then interconnected to the BUS 236 and operation thereof is similar to the MCU 210 shown in FIG. 2A.

As those skilled in the art will appreciate, the codec(s) 242 preferably include circuitry and computer readable instructions to convert audio data from the microphone(s) 232 and video data from the camera(s) 230 to compressed audio and video data, including data compliant with an MPEG protocol, for transmission through the network 224. One skilled in the art will recognize that other protocols can be implemented. Additionally, the codec(s) 242 also preferably decompress or de-convert data received form the network 224 to be rendered on the display(s) 228. To this effect, the display(s) 228 also preferably include speakers (not shown) for rendering audio signals which have been decompressed by the codec(s) 242. However, it should be appreciated external speakers and amplification systems (not shown) could be used without detracting from the scope of this disclosure.

Figure 3:
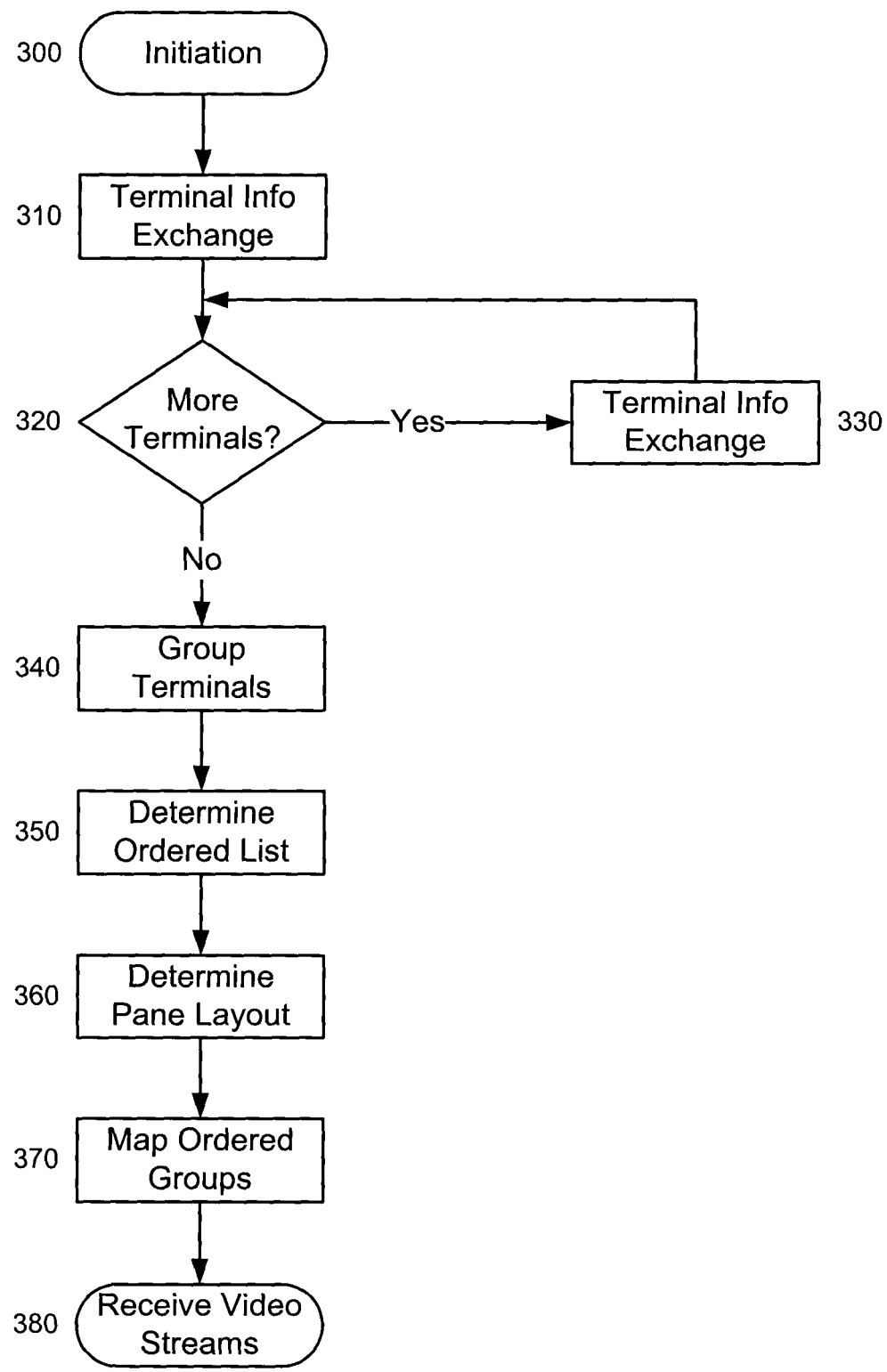
FIG. 3 is a schematic flow chart illustrating the principles of a method for processing video conference video streams according to aspects of this disclosure.

FIG. 3 is an algorithmic flow chart illustrating the principles of a method for processing video streams in conference between a plurality of video conferencing terminals.

The method starts at the initiation step 300, and proceeds to step 310, where a first and a second video conference terminal provides an image processing device with the properties of the respective video conference terminal. Preferably, the properties comprise the number of screens of the video conference terminal, and the number of video streams provided from the video conference terminal. The properties of the respective video conference terminals preferably also allows the image processing device to determine whether a video stream is allowed to be shown full screen or only to be shown in smaller panes as described below, e.g. the video resolution of the endpoint.

Next, in step 320, if the image processing device determines there are more connected video conference terminals to provide the image processing device with their respective properties, the method continues to step 330, if not the method continues in step 340. In step 330, the connected terminals provide the image processing device with the properties of the respective video conference terminal as described in step 310. This is repeated until terminal properties are exchanged for all connected terminals, and then the process proceeds to step 340.

In step 340, the image processing device groups the video conference terminals based on the properties provided from the video conference terminals. In particular, a group would typically have two, three or four members according to the number of screens of the video conference terminal and/or the number of video streams provided from the video conference terminal. A single screen/video stream endpoint will typically not be placed in a group, but could in an alternative implementation be placed in a group of one. In the following, a group of screens or video streams is referred to as a group.

Next, in step 350, the image processing device determines an ordered list of the groups and single screen endpoints for each of the video conference terminals. The ordered list of groups is preferably based on the voice switching order of the video conferencing terminals, excluding the terminal on which the view is to be displayed. Optionally, in an alternative embodiment, the ordered list includes the terminal on which the view is to be displayed at the end of the list if a self-view option for that terminal is enabled. In yet another alternative embodiment, the image processing device allows, for each conference, an "important" participant to be nominated. If there is an important participant nominated for a conference, the group of that participant is moved to the top of the ordered list for each of the ordered list, excluding the ordered list of the terminal including the group of the important participant.

In step 360, the image processing device determines a pane layout for each of the video conference terminals based on the properties of the video conference terminal itself and the properties of the other video conference terminals in the conference. Exemplary pane layouts according to the present invention are described below with reference to FIG. 4.

All of the layouts used by the image processing device follow a similar format. Specifically, in a preferred aspect, each has a number (which can be 0) of big rows and/or some number of small rows. The big rows are either full screen panes or a row of large panes across the centre of one or more screens. The small rows are either continuous presence (CP) panes overlaid near the base of full screen panes or separate small panes above and/or below the centre row of big panes. For layouts where all panes are the same size (for instance a 3×3 arrangement on a single screen) all rows are considered small rows.

If the layout has full screen big rows, then the presence of overlaid small CP panes will be controlled by a "show CP" flag for each individual view (i.e. the "show CP" flag for the group's constituent endpoints). If the layout's big rows are not full screen panes, the smaller CP panes above and below the centre row of larger panes will always be present.

Figure 5A:
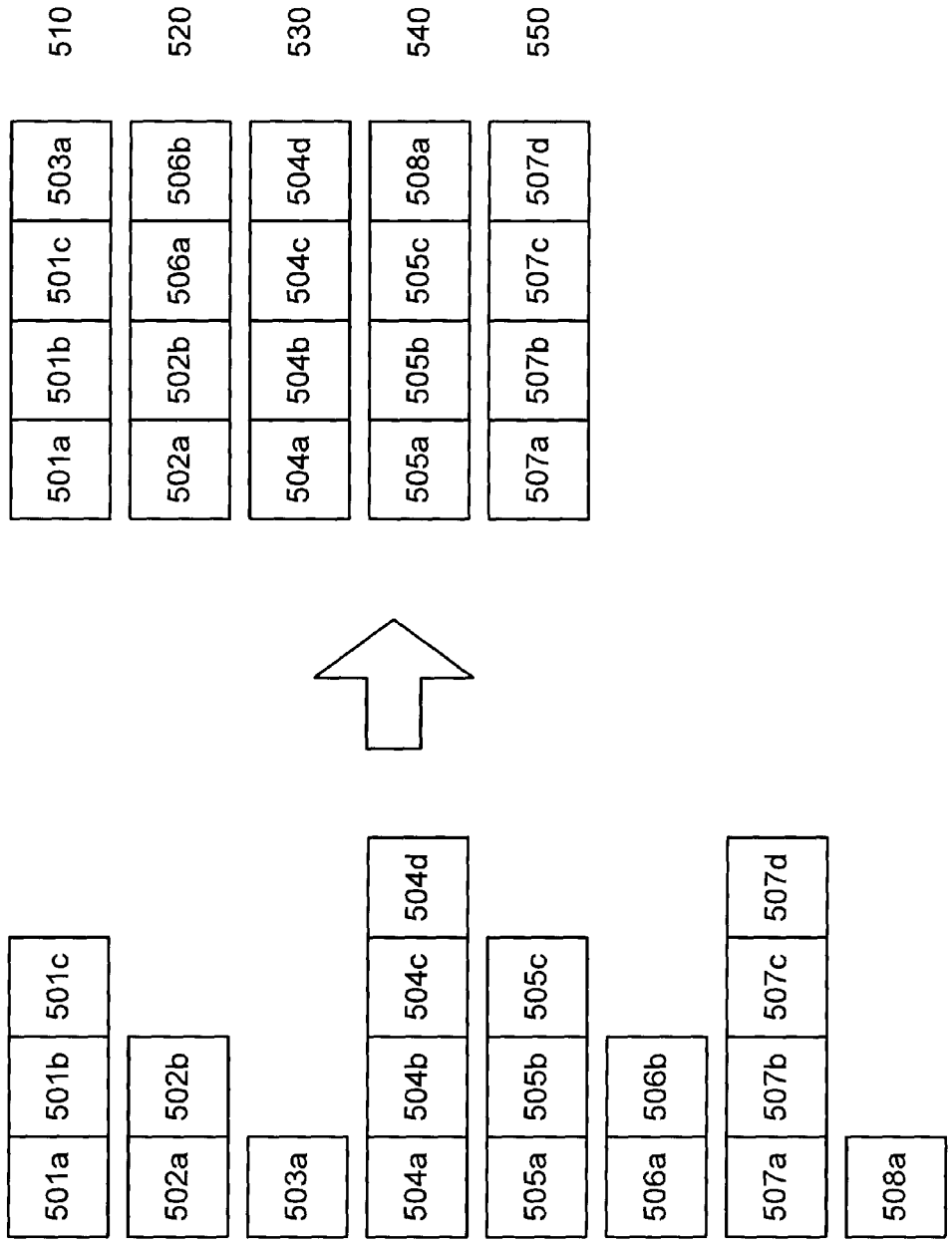
FIGS. 5A and 5B show exemplary mappings of ordered groups to screen layouts according to aspects of this disclosure.

In step 370, the image processing device maps the ordered groups into the rows of the selected pane layout for each of the video conference terminals. If the layout comprises a big row, the big row is filled first, and then the smaller rows are filled. The process of mapping the ordered groups is further described with reference to FIG. 5A, where eight different groups are mapped to a five row layout.

First, assuming that all groups are allowed to be shown full screen and that row 510 is a full screen row, the highest priority group, 501, is mapped to row 510. As only one screen is now available in row 510, the second priority group, 502, is mapped to row 520. The third priority group, or single screen, 503, is then mapped to the available screen in the first row, 510. Following the same process, group 504 fills row 530, group 505 and group 508 are mapped to row 540, group 506 fills the available screens in row 520, and finally group 507 fill row 550. The result of this mapping is identical to the mapping of the groups in the case all the rows were small rows.

Figure 5B:
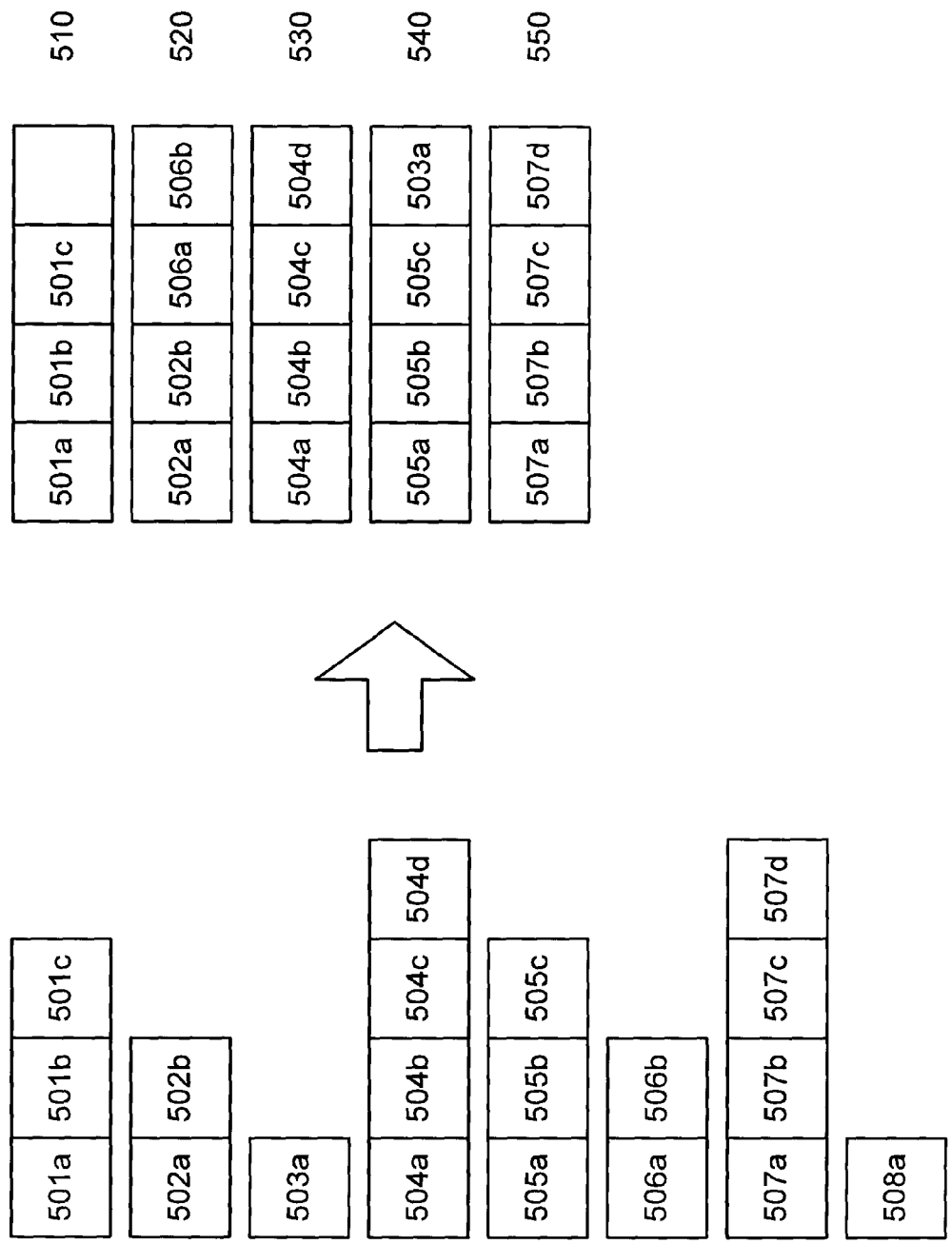

Now, assuming that row 510 is a full screen row and groups 503 and 508 are not allowed to be shown full screen. In this case, as shown in FIG. 5B, the highest priority group, 501, is mapped to the big row, 510, the second priority group, 502, is mapped to row 520. The third priority group, or single screen, 503, is not allowed to be mapped to the available screen in the first row, 510, and is waiting for an available screen. The single screen 503 is not allowed to be mapped based on information included in the exchange between the various terminals. Group 504 fills row 530 and group 505 mapped to row 540. Row 540 now has one available screen, to which group 503 is mapped. Group 506 fills the available screens in row 520, and finally group 507 fill row 550. In this case, the available screen in row 510 will be blank, and group 508 will not be shown. However, in an alternative embodiment groups 506 and 508 might be voice-switched by methods known by a person skilled in the art.

When the ordered groups are mapped to the selected layouts for each of the video conference terminals, the method continues to step 380, wherein the video processing device is receiving video streams from each of the groups. The video processing device processing the video streams is providing a separate composite video stream to each of the screens of the terminals according to the determined layouts.

As noted above regarding step 360 shown in FIG. 3, exemplary pane layouts according to this disclosure are described with reference to FIG. 4. As disclosed above, the selected pane layout is determined based on the properties of the video conference terminal itself and the properties of the other video conference terminals in the conference. In FIG. 4, the number of screens of the terminal on which the view is to be displayed is shown on the left side of the table and the properties of the other video conference terminals in the conference is shown on the upper side of the table.

In a first exemplary layout, the terminal on which the view is to be displayed is a one screen terminal. If at least one of the other video conference terminals is a four screen group, then the layout is effectively constructed on a 4×4 grid, wherein each row of four can contain a group of four, a three plus a one, etc. The filling order of the rows is typically: the second from the top, the third row from the top, the top row and finally the lowest row.

If there are no three screen terminals in the conference, but at least one of the other video conference terminals is a three screen group, then the layout is effectively constructed on a 3×3 grid, wherein each row of three can contain a group of three, a two plus one, etc. The filling order of the rows is typically: the middle row, the lowest row, and finally the top row.

If there are no three or four screen groups in the conference, then the layout is constructed on a 2×2 grid with single screen endpoints and two screen groups. The filling order of the rows is typically: the top row and finally the bottom row.

In a second exemplary layout, the terminal on which the view is to be displayed is a two screen terminal. If at least one of the other video conference terminals is a four screen group or a three screen group, the layout is constructed on four big panes across the centre, i.e. two panes on each screen, plus four groups of four panes, i.e. one group above and one below each set of the two big panes per screen. The four big panes in the middle are filled with as many of the groups in the ordered list as fit, i.e. if the group at the top of the list is a four screen terminal, then the group is displayed across all four panes. If the group at the top is not a four screen group, then more than one group may be displayed full screen. The filling order of the rows is typically: the big row, the bottom small rows and finally the top small rows.

If there are no three or four screen groups in the conference, then the layout is constructed on two full screen panes plus up to two continuous presence (CP) panes shown near the bottom of each screen. The two full screen panes can either be populated by a single two screen group or two single screen groups. The up to two CP panes typically each comprise two or four screens. The filling order of the rows is typically: the big row, then the small bottom rows.

In a third exemplary layout, the terminal on which the view is to be displayed is a three screen terminal. If at least one of the other video conference terminals is a four screen group, then the layout is constructed on four big panes across the centre, i.e. one big pane on the respective right and left screen, two panes on the middle screen, plus four groups of four panes, i.e. one group above and one below each set of the four big panes. The outer half screen of the respective right and left screen is left blank. The four big panes in the middle are filled with as many of the groups in the ordered list as fit, i.e. if the group at the top of the list is a four screen terminal, then the group is displayed across all four panes. If the group at the top is not a four screen group, then more than one group may be displayed full screen. The filling order of the rows is typically: the big row, the bottom small rows and finally the top small rows.

If there are no four screen systems in the conference, then the layout is constructed on three full screen panes plus up to six CP panes at the bottom of each screen. The filling order of the rows is typically: the big row, then the small bottom rows.

In a fourth exemplary layout, the terminal on which the view is to be displayed is a four screen terminal. In this configuration the layout is always constructed on four full screen panes plus up to four CP panes per screen, the CP panes being at the bottom of the screens. The filling order of the rows is typically; the big row, then the small bottom rows.

Figure 6A:
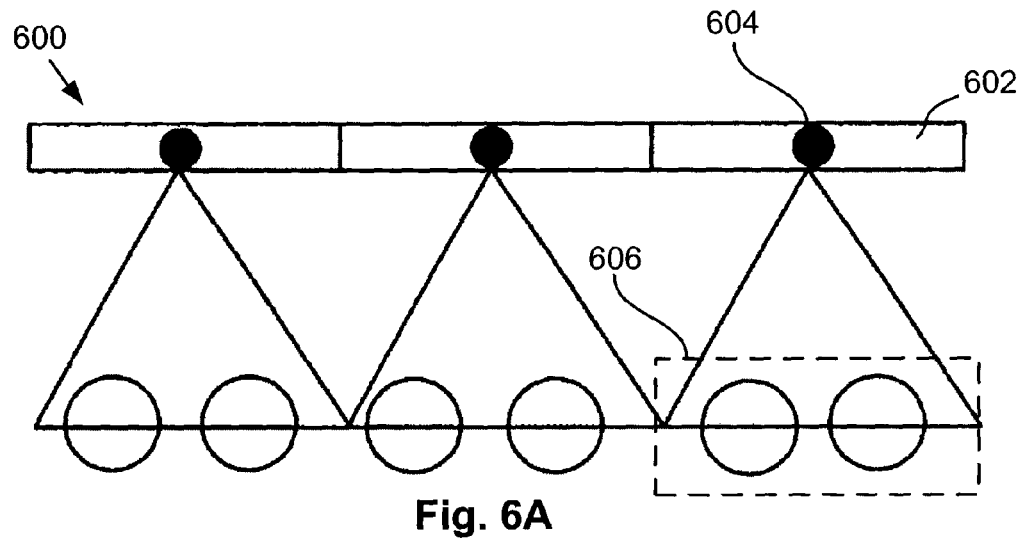
FIGS. 6A and 6B show exemplary modes of operation according to one aspect of this disclosure.
Figure 6B:
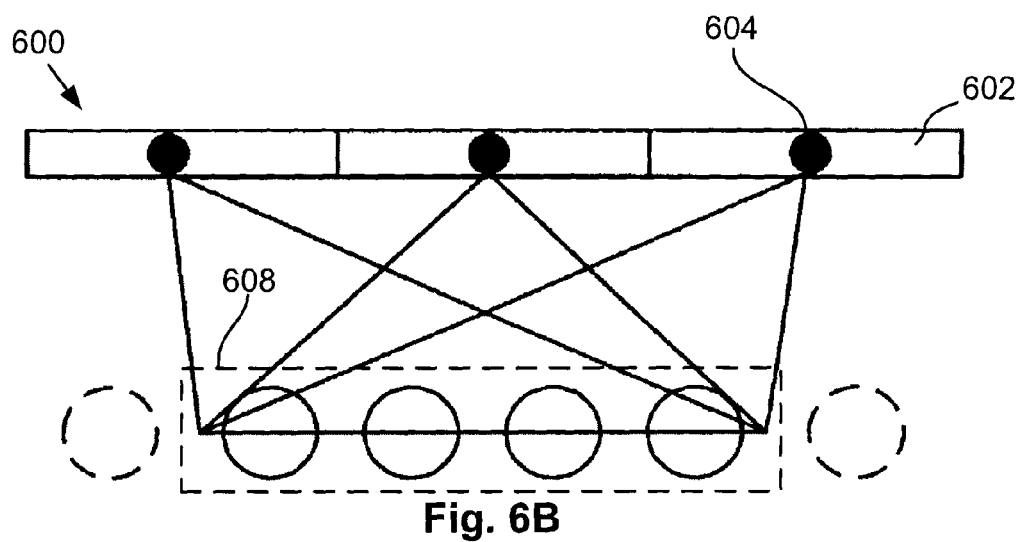

The four exemplary layouts described above are exemplary layouts of normal mode telepresence. An alternative telepresence mode is referred to as "round table mode" as incorporated in TANDBERG T3®, wherein the feeling of presence is further enhanced by creating a virtual round table meeting. As shown in FIGS. 6A and 6B, the T3® terminal 600 has three screens 602 and three video streams, i.e. one video stream from a camera 604 positioned over each screen. In normal mode, shown in FIG. 6A, each camera 604 is capturing the image of two seat positions 606 situated directly in front of the camera 604 and the screen 602, totaling to six seat positions, and is presented on other telepresence terminals as described above.

In round table mode, shown in FIG. 6B, each of the three cameras 604 captures the image of the four centre seat positions 608, essentially capturing a left view image, a centre view image, and a right view image of the four seat positions 608 from respective cameras 604.

Figure 7:
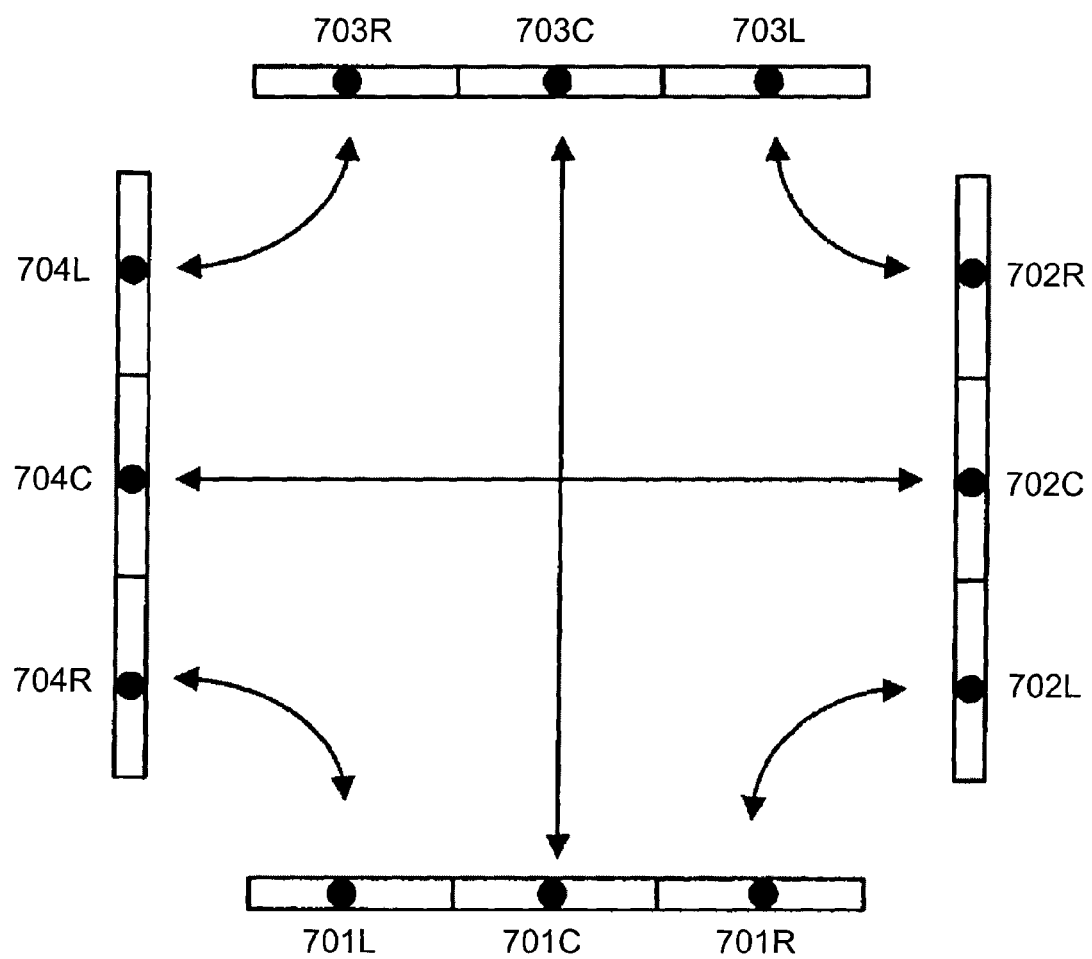
FIG. 7 is a schematic diagram of an exemplary configuration of telepresence terminals according to one aspect of this disclosure.

FIG. 7 schematically shows four terminals in round table mode, the arrows indicating which image is shown on which screen, e.g. centre screen (701C) of terminal 701 shows the image from the centre camera of terminal 703, right screen (701R) shows the image of the left side camera of terminal 702, left screen (701L) shows the image of the right side camera of terminal 704, etc. Thus, as shown in FIG. 8, all terminals view a "round" table where the participants are shown from the correct angle aligning the curvature of the table.

The round table layout described above is preferably a default mode, since it works well for three screen systems. Described below are exemplary layouts for one, two and four screen terminals respectively in a round table mode conference.

In a first exemplary round table layout, the terminal on which the view is to be displayed is a one screen terminal. The layout is effectively constructed on a 2×2 grid, each pane displaying the four seat positions. The filling order of the panes is typically: the top left, the top right, the left bottom and finally the bottom right pane. If only three round table terminals participate in the call, one pane is left blank. Alternatively the available pane is filled with a single screen endpoint. Optionally, up to three small CP panes might be displayed at the bottom of the screen; these CP panes are filled with the next three groups.

In a second exemplary round table layout, the terminal on which the view is to be displayed is a two screen terminal. The layouts are effectively constructed on four panes in a row across the centre of both screens, the panes showing the four round table groups in their correct positions (i.e. the first round table group of the conference is in the leftmost pane). Empty panes in this row of four can hold other single screen endpoints or potentially a two or three screen group if there are enough unused panes. Optionally, there are up to four groups of four panes, i.e. one group above and one below each set of the two big panes per screen available for showing single screen endpoints or other groups.

In a third exemplary round table layout, the terminal on which the view is to be displayed is a four screen terminal. The layouts are effectively constructed on four full screen panes, each pane showing the appropriate round table participant full screen, with eventual spare screens being used to show single screen endpoints. There are also up to four CP panes overlaid at the bottom of each screen if there are sufficient other conference participants.

In light of the above, an exemplary implementation is shown in FIG. 9, in which a center screen of a round table mode telepresence system includes three CP panes forming a group 902, a right screen includes two CP panes forming a group 904, and a left screen includes a single CP page forming a group 906. However, as one skilled in the art would appreciate, any of the aforementioned groups may include four CP panes, or an alternative number of CP panes to accommodate a wide variety of videoconferencing systems.

Thus, according to an aspect of this disclosure, an image processing device configured to perform the method described above is one of the video conferencing terminals involved in the video conference, e.g. a telepresence terminal, including the hardware and functional configurations shown in FIGS. 2A and 2B.

According to another aspect of the present invention, an image processing device configured to perform the method described above is preferably embodied as a multipoint control unit, e.g. a telepresence server, which has hardware and functional configurations similar to those shown in FIGS. 2A and 2B.

Moreover, any processes, descriptions or blocks in flow charts should be understood as representing modules, segments, portions of code which include one or more executable instructions for implementing specific logical functions or steps in the process, and alternate implementations are included within the scope of the exemplary embodiment of the present invention in which functions may be executed out of order from that shown or discussed, including substantially concurrently or in reverse order, depending upon the functionality involved, as would be understood by those skilled in the art. As such, the aforementioned processes can be implemented on a computer system, including the hardware platforms shown in FIGS. 2A and 2B, by means of a computer program stored on the various memory devices shown therein. Alternatively, the instructions for causing the hardware platforms to perform the process may be embodied as a propagated signal which carries information representing the processing instructions, e.g. a communication signal transferred between network elements in a local, regional or global computer network.

As will be recognized by a person skilled in the art with access to the teachings of this disclosure, several combinations and modifications of the present invention can be envisaged without leaving the scope of the present invention encompassed by the appended claims. Thus, numerous modifications and variations of the claimed invention are possible in light of the above teachings, and it is therefore to be understood that within the scope of the appended claims, the invention may be practiced otherwise than as specifically described herein.

The invention claimed is:

1. A method for an image processing device in conference between a plurality of video conferencing terminals, the method comprising:
   providing properties of at least two video conferencing terminals;
   defining, by the image processing device, a number of groups based on the provided properties of the at least two video conferencing terminals;
   determining, by the image processing device for a first video conferencing terminal, an ordered list of the number of groups;
   selecting, by the image processing device for the first video conferencing terminal, a pane layout for displaying images from other video conferencing terminals, the pane layout selected based on the provided properties of the first video conferencing terminal on which the pane layout is to be displayed and the properties of the other video conferencing terminals in the conference;
   mapping, by the image processing device for the first video conferencing terminal, the ordered list of the number of groups to the selected pane layout; and
   providing, by the image processing device, a composite image stream to the first video conferencing terminal according to the selected pane layout and the mapped ordered list of the number of groups.

2. The method according to claim 1, wherein the provided properties include a number of screens of a video conference terminal and a number of video streams provided from the video conference terminal.

3. The method according to claim 2, wherein the number of groups is defined according to the number of screens of the video conferencing terminal.

4. The method according to claim 2, wherein the number of groups is defined according the number of video streams provided from the video conferencing terminal.

5. The method according to claim 1, wherein the provided properties include information to determine whether or not a video stream is allowed to be shown in full screen on a video conference terminal.

6. The method according to claim 1, wherein the ordered list of the number of groups is determined based on a voice switching order of the plurality of video conferencing terminals.

7. The method according to claim 1, wherein the ordered list of the number of groups is determined by excluding the first video conferencing terminal, on which the selected pane layout is displayed.

8. The method according to claim 1, wherein the ordered list of the number of groups is determined by including the first video conferencing terminal, on which the selected pane layout is displayed, at the end of the ordered list.

9. The method according to claim 1, wherein one of the video conference terminals is nominated as an important participant, and the ordered list of the number of groups is determined by including the nominated video conference terminal at the top of the ordered list of number of groups.

10. The method according to claim 1, further comprising:
    defining a second video conferencing terminal as a member of a round table group based on the second conferencing terminal including angled image capture and the angled image capture being provided as a property of the second video conferencing terminal, wherein
    the selecting the pane layout, for displaying the images from the other video conferencing terminals by the first video conferencing terminal, is further based on the second video conferencing terminal being defined as a member of the round table group.

11. The method according to claim 10, further comprising:
    providing a round table image of the round table group in the composite image stream provided to the first video conferencing terminal.

12. The method according to claim 11, further comprising:
    providing, according to the selected pane layout, a third image from a third video conferencing terminal, other than the first and second video conferencing terminals, in the composite image stream, the third image overlying a portion of the round table image.

13. The method according to claim 12, further comprising:
    providing, according to the selected pane layout, a fourth image from a fourth video conferencing terminal, other than the first, second and third video conferencing terminals, in the composite image stream, the fourth image overlying a portion of the round table image and adjacent to the third image when the third and fourth video conferencing terminals are members of a same defined group.

14. The video conferencing device according to claim 10, further comprising:
    a video conferencing terminal.

15. The video conferencing device according to claim 10, further comprising:
    a telepresence terminal.

16. The video conferencing device according to claim 10, further comprising:
   a multipoint control unit.

17. The video conferencing device according to claim 10, further comprising:
   a telepresence server.

18. An image processing device for processing images in conference between a plurality of video conferencing terminals, comprising:
   means for providing properties of at least two video conferencing terminals;
   means for defining a number of groups based on the provided properties of the at least two video conferencing terminals;
   means for determining, for a first video conferencing terminal, an ordered list of the number of groups;
   means for selecting, for the first video conferencing terminal, a pane layout for displaying images from other video conferencing terminals, the pane layout selected based on the provided properties of the first video conferencing terminal on which the pane layout is to be displayed and the properties of the other video conferencing terminals in the conference;
   means for mapping, for the first video conferencing terminal, the ordered list of the number of groups to the selected pane layout; and
   means for providing a composite image stream to the first video conferencing terminal according to the selected pane layout and the mapped ordered list of the number of groups.

19. A non-transitory computer readable medium including computer executable instructions, that when executed by a processing device in a video conference system, causes the processing device to perform a method, the method comprising:
   providing properties of at least two video conferencing terminals;
   defining a number of groups based on the provided properties of the at least two video conferencing terminals;
   determining, for a first video conferencing terminal, an ordered list of the number of groups;
   selecting, for the first video conferencing terminal, a pane layout for displaying images from other video conferencing terminals, the pane layout selected based on the provided properties of the first video conferencing terminal on which the pane layout is to be displayed and the properties of the other video conferencing terminals in the conference;
   mapping, for the first video conferencing terminal, the ordered list of the number of groups to the selected pane layout; and
   providing a composite image stream to the first video conferencing terminal according to the selected pane layout and the mapped ordered list of the number of groups.

* * * * *